Patented Apr. 28, 1931

1,802,661

UNITED STATES PATENT OFFICE

RALPH H. McKEE, OF LEONIA, NEW JERSEY

PREPARATION OF CHLORINE FOR THE TREATMENT OF COLDS AND THE LIKE

No Drawing.  Application filed June 15, 1925. Serial No. 37,324.

This invention relates to the preparation of chlorine, and more particularly to an improvement in the method of handling it for use in the treatment of colds and other germ infectious diseases.

Since the adoption of chlorine by the medical profession for the treatment of colds, and other germ infectious diseases, several methods have been suggested for liberating the desired amount of chlorine in a room. The ordinary method is to furnish about one gram of chlorine gas for each 1000 cubic feet of space, that is, approximately 300 cubic centimeters of chlorine is set free in a room of the size of an ordinary bath room, and the patient breathes the chlorinated atmosphere for approximately three quarters of an hour. In most cases, such treatment has been a decided benefit to the patient and in many cases has practically completely removed the condition commonly known as a cold.

The difficulty encountered at the present time in the use of such treatment is the lack of a convenient method of handling the chlorine gas. One method now employed is to break a globe of chlorine gas containing approximately 300 cubic centimeters in a small room. However, the size of the globe which must be used causes trouble due to the fact that it is large, awkward and dangerous to use because of the broken glass. It is further objectionable from the merchants' standpoint because of its fragile character and is thus likely to become broken in transit or on the shelves of the store. When so broken in a store, it not only entails a loss but is objectionable due to the odor of the chlorine gas set free. It has been proposed to employ a small electrolytic battery operated on a hydrochloric acid solution and for the user to employ a mask or muzzle through which the chlorine gas liberated is breathed for a period of approximately 45 minutes. Another method that has been proposed and could possibly be used would be to liberate chlorine gas from a cylinder or container in which a quantity of liquid chlorine is placed and thus permit the gas to be injected into the room where the patient is when the container is opened. Both of these last methods, however, are open to the serious objection that it is difficult to properly regulate the amount of chlorine liberated.

In the present invention, I provide a method of releasing a given quantity of chlorine gas by dissolving chlorine in a volatile liquid which does not destroy or use up the chlorine. The liquid is placed in a small container, such as a glass ampule and is adapted to be broken when it is to be used and the contents thereof poured into a saucer from which the chlorine and the volatile liquid are rapidly liberated. The solvents which may be employed for this purpose most advantageously are carbon tetrachlorid and methylene chlorid.

By dissolving the chlorine in a liquid in the manner set forth and placing the same in an ampule, a product is obtained which will occupy only a small space on the druggists' shelves and which is not likely to be broken when handled as merchandise.

A further advantage of the invention is the fact that it changes the chlorine process of treating colds from a process which must be performed in a hospital or doctor's office to one which can be carried out in the home under the direction of the physician or even by the patient alone.

The method also permits the amount of chlorine liberated to be accurately regulated and removes the possibility of overtreatment as in some of the methods heretofore employed.

While various solvents such as set forth above may be employed, I prefer to use methylene chlorid due to the fact that it is more readily volatile than most other convenient liquids. It also possesses the further advantages that it is a good solvent for chlorine gas and is, in itself, a mild anæsthetic. Due to its anæsthetic qualities, it tends to quiet the nerves of the patient, which effect is particularly desirable in this method of treatment because the chlorine gas has an exciting effect on the nerves of the individual. The irritating effect of the chlorine gas is of no advantage in the medical treatment and is only an accidental feature thereof. Accordingly, methylene chlorid would, to a certain extent, counteract this exciting and irritating effect of the chlorine gas.

The amount of methylene chlorid employed to dissolve the desired amount of chlorine is small and is too small to be objectionable from its physiological side; that is, as an anæsthetic, but sufficient to serve as a quieting influence on the nerves.

In practicing the process, chlorine gas is run into cold methylene chlorid until approximately one gram of chlorine is dissolved in about three cubic centimeters of the cold solvent. This amount is then introduced into a small glass ampule, say of 5 or 7 cubic centimeters and the ampule sealed in the usual manner. When the chlorine is to be used, the ampule is opened by the patient and emptied into a shallow vessel in a closed room. In a few minutes, the chlorine and its solvent evaporate into the room. The number of ampules or the size of the ampule is determined by the size of the room to be used for the treatment. In general, one ampule carrying one gram of chlorine gas will serve for a room containing 1000 cubic feet. After the ampule has been opened and the chlorine gas permitted to escape from the volatile liquid into the room, the patient remains in the chlorinated atmosphere for a period of about 45 minutes in the manner heretofore employed in the chlorine treatment of colds and the like, and the treatment may be repeated at intervals if desired or necessary, as prescribed by the physician.

When other solvents are employed, the chlorine is dissolved in the solvent in the same manner, the solution sealed in the ampule and the ampule opened in the manner above described.

It has been proposed to employ liquid chlorine in an ampule but the use of chlorine in liquid form, or chlorine dissolved in any solvent whose boiling point is below normal room temperature necessitates the use of an ampule which would be subjected to high pressure at all times and when the ampule is opened, there would be danger of flying glass and other difficulties due to the high pressure necessary in the ampule to keep the chlorine or the solvent in liquid form.

It will be apparent that the product simplifies the chlorine treatment of colds to such an extent that it may be used in the home, either under the directions of a physician or by the individual patient.

While I have described in detail the preferred practice of my process, it is to be understood that the details of procedure may be widely varied without departing from the spirit of the invention or the scope of the subjoined claims.

I claim:

1. The method of preparing chlorine for use in the treatment of colds and the like which comprises dissolving chlorine in methylene chlorid, placing a predetermined quantity of the solution in a fragile container, and sealing it.

2. The method of preparing chlorine for use in the treatment of colds and the like which comprises dissolving chlorine in methylene chlorid in the proportion of substantially one gram of chlorine to 3 cubic centimeters of methylene chlorid, placing a predetermined quantity of the solution in a container, and sealing it.

3. The method of preparing chlorine for use in the treatment of colds and the like which comprises dissolving chlorine in a readily volatile chlorine solvent having mild anesthetic action selected from the group consisting of methylene chlorid and carbon tetrachlorid, and placing a predetermined quantity of the solution in a fragile glass container and sealing it.

4. The method of preparing chlorine for use in the treatment of colds and the like which comprises sealing in a fragile glass container a predetermined quantity of a solution of chlorine in a chlorine solvent having a mild anesthetic action selected from the group consisting of methylene chlorid and carbon tetrachlorid, the amount of chlorine dissolved in said solvent being sufficient for a single treatment when the solution in said container is evaporated in a room of predetermined size.

In testimony whereof, I affix my signature.

RALPH H. McKEE.